(12) United States Patent
Ray et al.

(10) Patent No.: US 8,225,390 B2
(45) Date of Patent: Jul. 17, 2012

(54) LICENSING PROTECTED CONTENT TO APPLICATION SETS

(75) Inventors: Kenneth D. Ray, Seattle, WA (US); Pankaj M. Kamat, Kirkland, WA (US); Charles W. Kaufman, Sammamish, WA (US); Paul J. Leach, Seattle, WA (US); William R. Tipton, Seattle, WA (US); Andrew Herron, Redmond, WA (US); Krassimir E. Karamfilov, Bellevue, WA (US); Duncan G. Bryce, Redmond, WA (US); Jonathan D. Schwartz, Kirkland, WA (US); Matthew C. Setzer, Woodinville, WA (US); John McDowell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 610 days.

(21) Appl. No.: 12/163,548

(22) Filed: Jun. 27, 2008

(65) Prior Publication Data

US 2009/0328134 A1 Dec. 31, 2009

(51) Int. Cl.
*G06F 21/00* (2006.01)
(52) U.S. Cl. .......................... 726/17; 726/27
(58) Field of Classification Search .................. 726/1–4, 726/16, 17, 21, 26–29; 705/51, 56
See application file for complete search history.

(56) References Cited

U.S. PATENT DOCUMENTS

| | | | |
|---|---|---|---|
| 6,330,670 B1 | 12/2001 | England et al. | |
| 7,069,330 B1 * | 6/2006 | McArdle et al. | ............... 709/229 |
| 7,089,594 B2 | 8/2006 | Lal et al. | |
| 7,210,039 B2 | 4/2007 | Rodgers et al. | |
| 7,213,266 B1 | 5/2007 | Maher et al. | |
| 7,296,296 B2 | 11/2007 | Dunbar et al. | |
| 2002/0049679 A1 | 4/2002 | Russel | |
| 2003/0217011 A1 | 11/2003 | Peinado et al. | |
| 2005/0080746 A1 | 4/2005 | Zhu | |
| 2005/0125548 A1 * | 6/2005 | England et al. | ............... 709/229 |
| 2005/0216745 A1 | 9/2005 | Speare et al. | |
| 2005/0257271 A1 | 11/2005 | Lafornara | |
| 2007/0113079 A1 * | 5/2007 | Ito et al. | ......................... 713/166 |
| 2007/0168665 A1 * | 7/2007 | Kim et al. | ...................... 713/171 |
| 2007/0219917 A1 | 9/2007 | Liu et al. | |
| 2008/0052395 A1 | 2/2008 | Wright et al. | |
| 2008/0060083 A1 | 3/2008 | Koved | |

OTHER PUBLICATIONS

Microsoft, Access Policy Management: Authorizing for Access, Dec. 2005, 20 pages.
IBM Internet Security Systems Market Brief, "How to take the fear out of bringing government systems online", 2007, 11 pages.
ENTRUSTSecuring Digital Identities & Information, "Entrust Entelligence Group Share", 2007, 2 pages.

* cited by examiner

*Primary Examiner* — Gilberto Barron, Jr.
*Assistant Examiner* — Malcolm Cribbs
(74) *Attorney, Agent, or Firm* — Workman Nydegger

(57) ABSTRACT

The present invention extends to methods, systems, and computer program products for licensing protected content to application sets. Embodiments of the invention permit a local machine to increase its participation in authorizing access to protected content. For example, an operating system within an appropriate computing environment is permitted to determine if an application is authorized to access protected content. Thus, the application is relieved from having to store a publishing license. Further, authorization decisions are partially distributed, easing the resource burden on a protection server. Accordingly, embodiments of the invention can facilitate more robust and efficient authorization decisions when access to protected content is requested.

20 Claims, 4 Drawing Sheets

LICENSING PROTECTED CONTENT TO APPLICATION SETS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic content. Accordingly, the performance of many computing tasks are distributed across a number of different computer systems and/or a number of different computing components.

Nonetheless, although electronic content may be accessible to a number of computer systems, the creator of the electronic content may desire to limit access to the electronic data. In some environments, one or more access mechanisms, such as, for example, password protection, setting file attributes, (e.g., read-only, etc.), firewalls, etc., can be used to limit access to electronic content. These mechanisms provide essentially the same level of electronic content access to anyone who is authorized. However, if a user can access a file, there is typically no limitation on what that can do with the contents of a file. For example, if a user can read a file, the user can copy the file contents to another location in which others may be able to access the file, the user can print the file and leave a hardcopy somewhere, etc, typically with no limitations.

As a result, in some environments, a creator of electronic content may desire more configurable and/or granular access control to their electronic content. In these other environments, a content creator can use Digital Rights Management ("DRM") to control access to their electronic content. DRM generally includes access control technologies used by content creators to limit usage of electronic content (or instances thereof). Thus, various different types of DRM have been developed to protect different types of electronic content, such as, for example, pictures, movies, videos, music, programs, multi-media, games, documents, etc.

One category of DRM, Enterprise Rights Management ("ERM") is often used to control access to documents, such as, for example, electronic mail messages, Word processing documents, and Web pages, etc. Rights Management Services ("RMS") is an ERM solution. RMS can be used to encrypt documents, and through server-based policies, prevent the documents from being decrypted except by specified people or groups, in certain environments, under certain conditions, and for certain periods of time. Document based operations like printing, copying, editing, forwarding, and deleting can be allowed or disallowed for individual documents. RMS administrators can deploy RMS templates that group these rights together into predefined policies that can be applied en masse to content.

Accordingly, RMS-protected content can be created by RMS-enabled applications. RMS-protected content is encrypted and can contain an embedded usage policy, which defines the rights each user or group has to the content. An RMS system works by assigning rights to trusted entities, which are either single users or groups of users. Rights are assigned on a per-entity basis. RMS defines and recognizes several rights by default—such as permission to read, copy, print, save, forward, and edit—and can be extended to recognize additional rights (which each application would have to explicitly implement).

Generally, to protect content, a content author specifies a publishing license ("PL") that is to apply to the content. The publishing license contains all the relevant access control and use restriction information for protecting the content. The content author then submits the content and PL to an RMS-enabled application that applies the access control and use restriction information to the content. When a user requests access to the content, the access control and use restriction information is evaluated to determine access rights for the user.

Initially, a user can submit authentication information to an RMS server to prove their identity. Subsequently, the RMS server can check the access control and use restriction information to determine the user's rights in the content. The RMS server can then return a use license ("UL") reflecting the user's permitted access in the content.

However, security at a user's machine is maintained by an RMS component that does not trust other processes and only minimally trusts the execution environment (including shared dlls, other software on the system, user mode debuggers, etc.) provided by the operating system. Further, the RMS component attempts to protect the RMS process from attacks, such as, process debuggers, kernel mode debuggers, other applications, code injection attacks, rerouting of the Import Access Table, etc. The RMS component uses anti-debugging, obfuscation, and other DRM techniques for accomplishing this task. The RMS component attempts to provide a "safe" place to evaluate policy and a "safe" place to store root secrets, which allows for caching of data enabling off-line access to protected data. In addition it includes Module Authentication, which attempts to validate the calling application, its calling stack, etc. Applications using this type of RMS component require a special RMS manifest and signature.

However, although heavily obfuscated, the RMS component, at its core, contains a public/private key pair used for communication to the RMS server and for storage of root secrets.

Access to data is protected by the PL that is kept with the data itself The PL contains all the relevant access control and use restriction information protecting that data. The PL is bound with public key cryptography to a specific RMS Server and is signed by the client machine's client license certificate ("CLC") which the corporate RMS server issued to the client machine. A URL to that RMS server is contained in the clear in the PL so that an RMS aware application can find the specific RMS server to request access to the protected information.

In order for the client application to read the data, the RMS component must first obtain a rights management account certificate ("RAC"), which identifies a specific user. The RAC contains both a public and private portion. Before the RMS server issues a RAC to a given application it first validates that that local security environment is valid. This check is typically performed by asking the RMS component to sign with an embedded private key. This code path heavily relies on obfuscation and other "black box" techniques and functions only if the surrounding environment is valid. Breaches to both the function itself and direct extraction of the embedded private key from the RMS component's RSA Vault would allow a compromised environment to fool the server into issuing the RAC anyway. The RAC is protected by the local RMS security and by the logon credentials of the user.

Secondly, the client application must obtain the UL. A client sends its identification in the form of the RAC to the RMS server, along with the PL for the content it wishes to consume. In response, the RMS server checks the PL to ensure that the specific identity represented by the RAC is authorized to read the content. If authorized, the RMS server then creates a UL that is encrypted to the RAC. The UL can be cached on the local machine to facilitate subsequent off-line access to the data.

Unfortunately, the RMS component's minimal trust of the operating system forces each client application to develop its own method for storing PLs along with protected content. PLs can be of variable length further complicating the client application's ability to store PLs. Typically, a client application uses its own data format to store PLs. For example, a client application can store a PL in a header in the file format, in an additional message or packet header in a transmission of protected data, etc.

BRIEF SUMMARY

The present invention extends to methods, systems, and computer program products for licensing protected content to application sets. In some embodiments, a computer system detects that a user is attempting to access protected content through an application at the computer system. The content is protected in accordance with a protection policy managed by a digital rights management ("DRM") system that includes a separate digital rights management server. The protection policy includes an application set that identifies a set of applications that are allowed to access the content.

Prior to allowing the application to access the protected content, the computer system exchanges information with the DRM server to obtain a user key corresponding to the user. The user key is for use in accessing the protected content. Also prior to allowing the application to access the protected content, the computer system determines that the application is in the application set. The computer system allows the application to use the user key to access the protected content in response to the determination.

In other embodiments, a computer system detects that a user is attempting to access protected content through an application at the computer system. The protected content is protected in accordance with a protection policy specified by a business owner of a business that originated the protected content. The protection policy indicates: users that are authorized to access the content, operations authorized users are permitted to perform with respect to the content, computing environments that are permitted to access the content, and a set of applications that are permitted to access the content.

The computer system sends user identity information for the user to a content protection server. The computer system sends the computing environment of the computer system to the content protection server. The computer system receives a user key from the protection server. The user key is usable by the user to access the protected content. The user key is returned from the content protection server to the computer system in response to authenticating the user and in response to determining that the computing environment is appropriate for evaluating application set membership.

The operating system at the computer system determines if the application is included in the set of applications in the protection policy. The operating system appropriately regulates the application's access to the protected content based on the determination. The operating system's regulation can include permitting the application to access the protected content when the application is included in the set of applications in the protection policy. The operating system's regulation can also include preventing the application from accessing the protected content when the application is not included in the set of applications in the protection policy.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
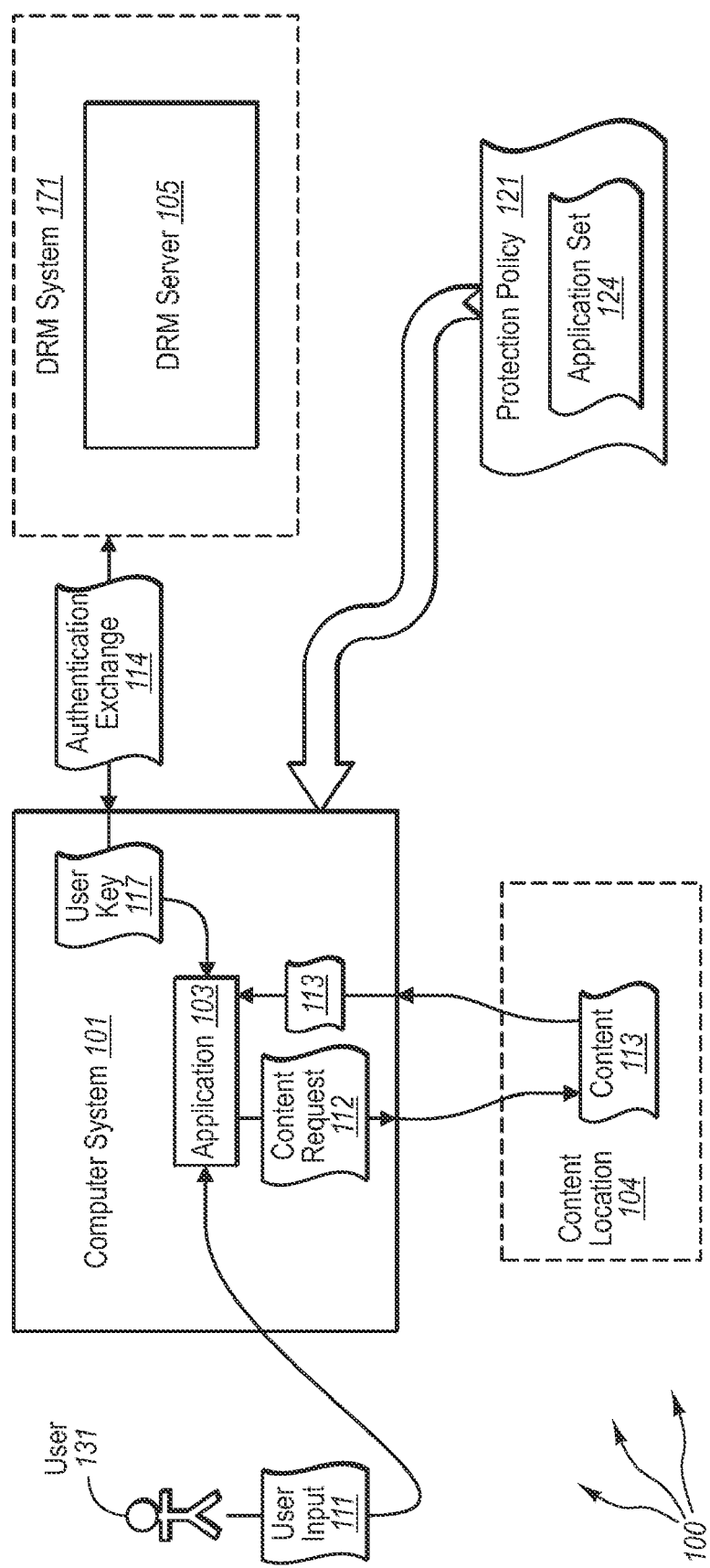
FIG. 1 illustrates a view of an example computer architecture that facilitates licensing protected content to application sets.

The present invention extends to methods, systems, and computer program products for licensing protected content to application sets. In some embodiments, a computer system detects that a user is attempting to access protected content through an application at the computer system. The content is protected in accordance with a protection policy managed by a digital rights management ("DRM") system that includes a separate digital rights management server. The protection policy includes an application set that identifies a set of applications that are allowed to access the content.

Prior to allowing the application to access the protected content, the computer system exchanges information with the DRM server to obtain a user key corresponding to the user.

The user key is for use in accessing the protected content. Also prior to allowing the application to access the protected content, the computer system determines that the application is in the application set. The computer system allows the application to use the user key to access the protected content in response to the determination.

In other embodiments, a computer system detects that a user is attempting to access protected content through an application at the computer system. The protected content is protected in accordance with a protection policy specified by a business owner of a business that originated the protected content. The protection policy indicates: users that are authorized to access the content, operations authorized users are permitted to perform with respect to the content, computing environments that are permitted to access the content, and a set of applications that are permitted to access the content.

The computer system sends user identity information for the user to a content protection server. The computer system sends the computing environment of the computer system to the content protection server. The computer system receives a user key from the protection server. The user key is usable by the user to access the protected content. The user key is returned from the content protection server to the computer system in response to authenticating the user and in response to determining that the computing environment is appropriate for evaluating application set membership.

The operating system at the computer system determines if the application is included in the set of applications in the protection policy. The operating system appropriately regulates the application's access to the protected content based on the determination. The operating system's regulation can include permitting the application to access the protected content when the application is included in the set of applications in the protection policy. The operating system's regulation can also include preventing the application from accessing the protected content when the application is not included in the set of applications in the protection policy.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

With this description and following claims, a "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates licensing protected content to application sets. As depicted, computer architecture 100 includes a variety of components and data including computer system 101, DRM system 171, DRM server 105, content location 104, and protection policy 121. Each of the depicted components and data can be connected to one another over a system bus and/or over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, computer system 101 includes one or more applications that can, from time to time, request access to content protected in accordance with a protection policy. Content can be stored at remote network drives, at Web sites, in databases, in the memory of computer system 101, at message servers, etc. DRM system 171 includes DRM server 105. DRM server 105 can manage protection policies for protected content and provide client computer systems with keys, licenses, etc. for accessing protected content.

Figure 3:
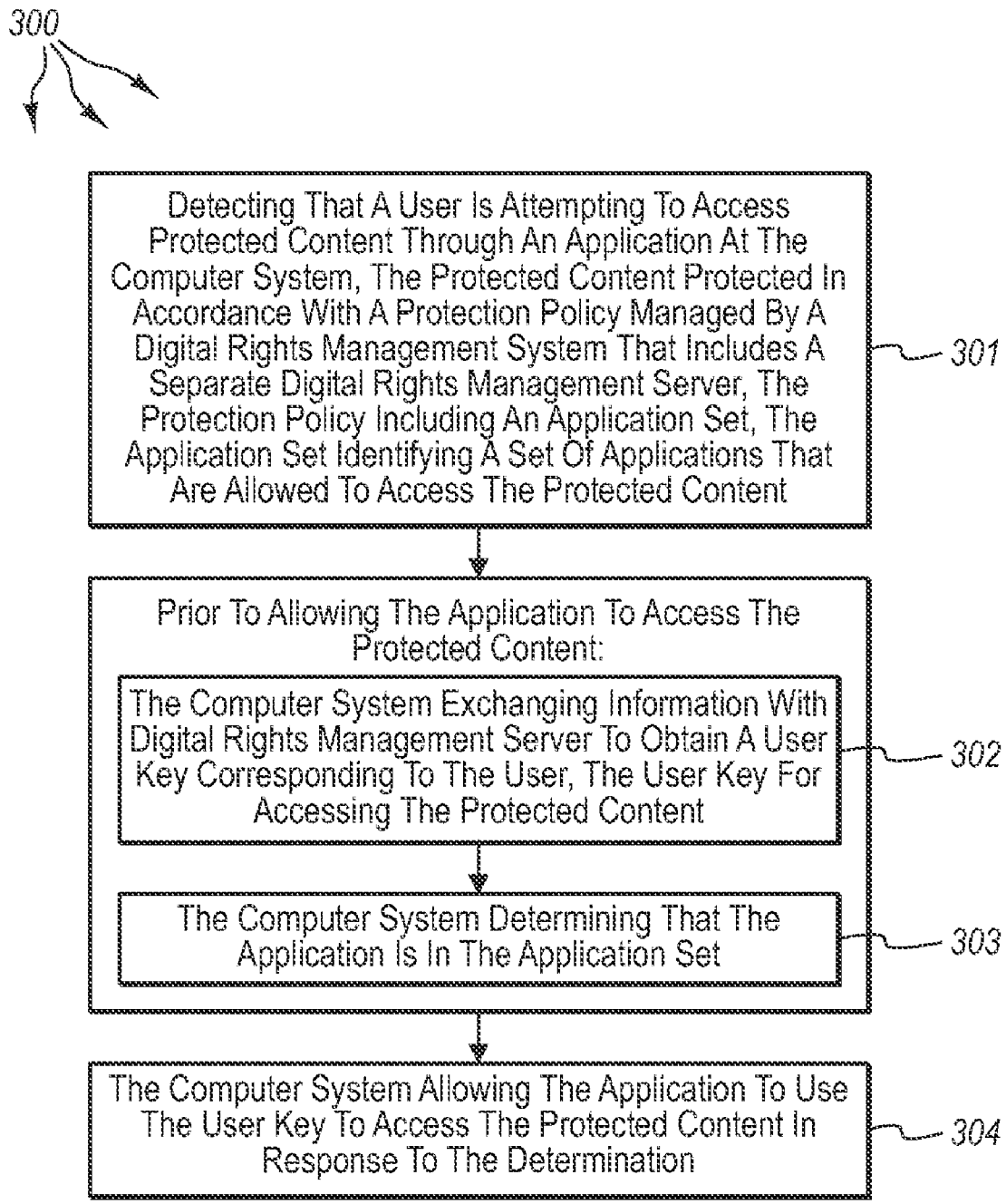
FIG. 3 illustrates a flow chart of an example method for providing access to protected content.

FIG. 3 illustrates a flow chart of an example method 300 for providing access to protected content. Method 300 will be described with respect to the components and data of computer architecture 100 depicted in FIG. 1.

User 131 can enter user input 111 to application 103 to request access to content 113. In response to user input 111, application 103 can send content request 112 to attempt to access content 113 from content location 104. Content location 104 can be virtually any internal (e.g., system memory, etc.), local (connected hard drive, etc.), or remote location (network drive, Web site, etc.) from the perspective of computer system 101.

Method 300 includes an act of detecting that a user is attempting to access protected content through an application at the computer system, the content protected in accordance with a protection policy managed by a digital rights management system that includes a separate digital rights management server, the protection policy including an application set, the application set identifying a set of applications that are allowed to access the content (act 301). For example, computer system 101 can detect that content request 112 is an attempt to access content 113 from content location 104. Content 113 can be protected in accordance with protection policy 121 that is managed by DRM server 105. Protection policy 121 includes application set 124 identifying a set of applications that are allowed access to content.

Applications can be identified by application ID. An application ID can be based on one or more of an application, application version, application patch history, application ownership, application certification, etc. Thus, application set 124 can include a list of application IDs.

Prior to allowing the application to access the protected content, method 300 can include an act of the computer system exchanging information with digital rights management server to obtain a user key corresponding to the user, the user key for accessing the protected content (act 302). For example, computer system 101 and DRM server 105 can perform authentication exchange 114 resulting in the issuance of user key 117 (corresponding to user 131) to computer system 101.

Prior to allowing the application to access the protected content, method 300 can also include an act of the computer system determining that the application is in the application set (act 303). For example, computer system 101 can determine that application 103 is included in application set 124. Computer system 101 can generate or access a previously generated application ID for application 103. The application ID can be generated from one or more of the application, application version, application patch history, application ownership, application certification, etc. of application 103. Computer system 101 can compare the application ID for application 103 to application IDs included applications set 124. In response to the comparison revealing that the application ID for application 103 is included in application set 124, computer system 101 determines that application 103 is included in application set 124.

Method 300 includes an act of the computer system allowing the application to use the user key to access the protected content in response to the determination (act 304). For example, computer system 101 can allow application 103 to use user key 117 to access content 113 (from content location 104) in response to determining that application 103 is included in application set 124.

Figure 2:
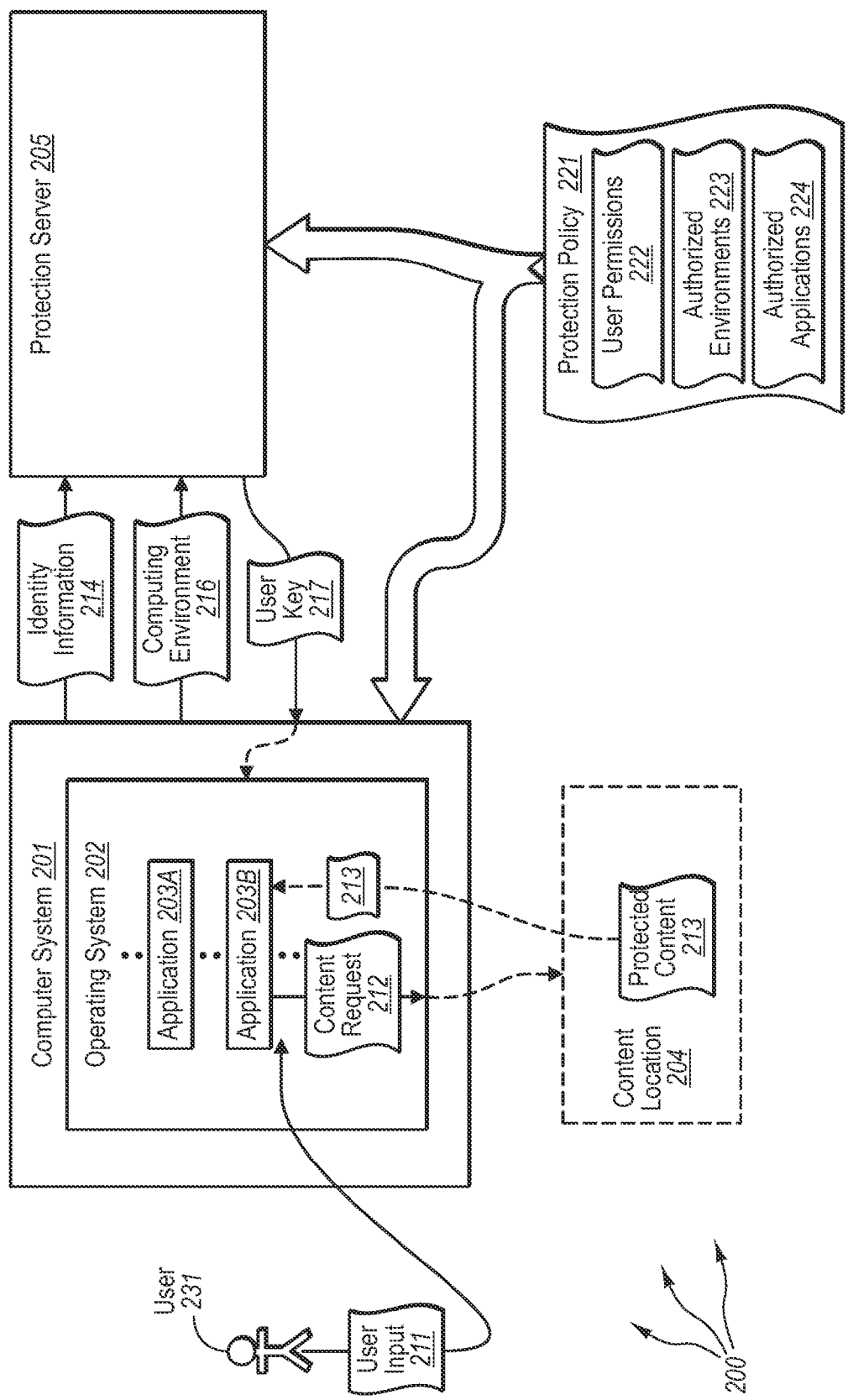
FIG. 2 illustrates a view of another example computer architecture that facilitates licensing protected content to application sets.

In some embodiments, an operating environment is also considered when determining whether access to protected content is to be allowed or denied. FIG. 2 illustrates an example computer architecture 200 that facilitates licensing protected content to application sets. As depicted, computer architecture 200 includes a variety of components and data including computer system 201, protection server 105, content location 204, and protection policy 221. Each of the depicted components and data can be connected to one another over a system bus and/or over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network Generally, computer system 202 includes one or more applications 203A, 203B, etc. that run within operating system 202. The one or more applications can from time to time, request access to content protected in accordance with a protection policy. Content can be stored at remote network drives, at Web sites, in databases, in the memory of computer system 201, at message servers, etc. Protection server 205 can manage protection policies for protected content and provide client computer systems with keys, licenses, etc. for accessing protected content.

Figure 4:
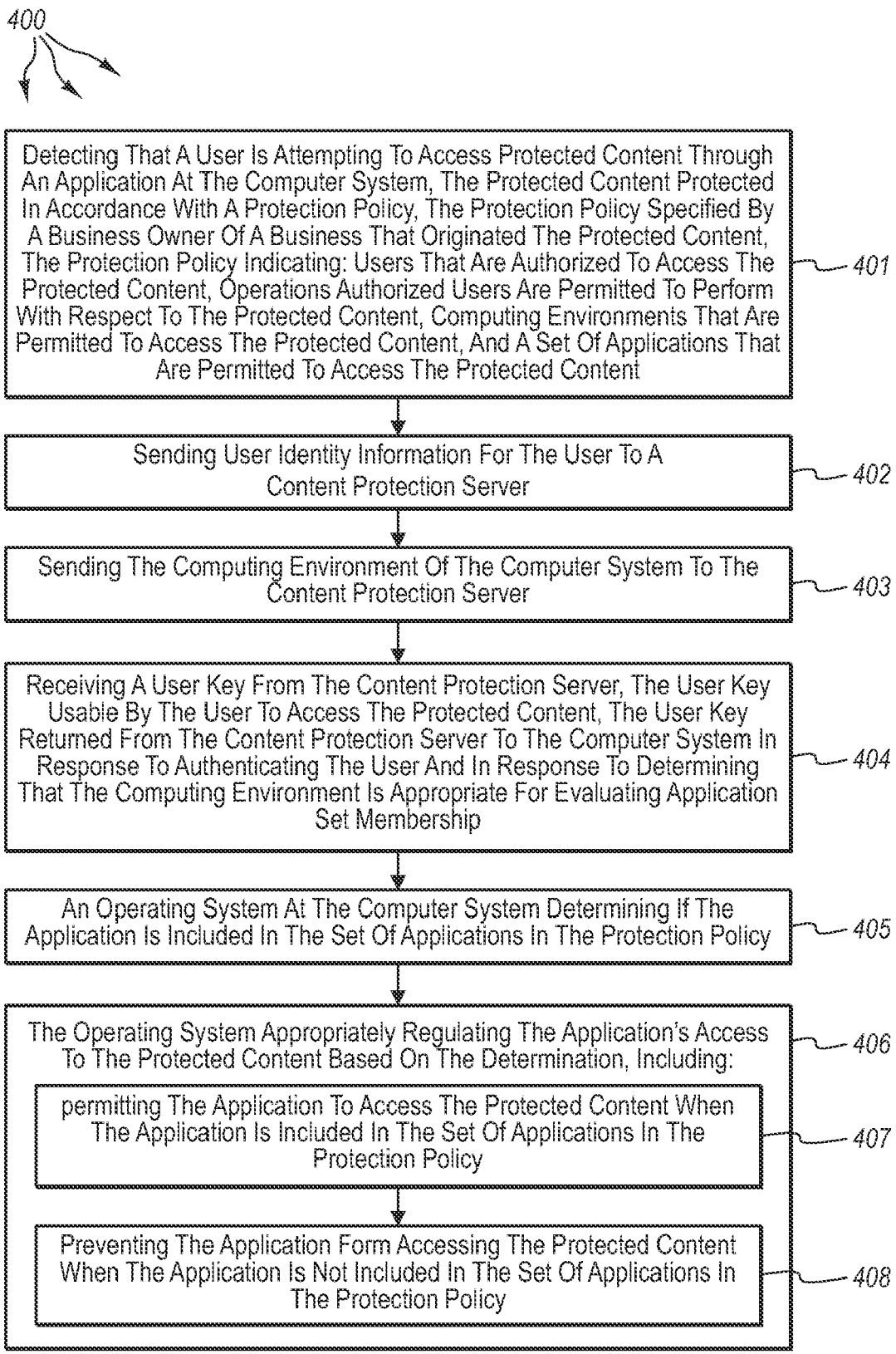
FIG. 4 illustrates a flow chart of an example method for providing access to protected content.

FIG. 4 illustrates a flow chart of an example method 400 for providing access to protected content. Method 400 will be described with respect to the components and data of computer architecture 200 depicted in FIG. 2.

User 331 can enter user input 211 to application 203B to request access to protected content 213. In response to user input 211, application 203B can send content request 212 to attempt to access protected content 213 from content location 204. Content location 204 can be virtually any internal (e.g., system memory, etc.), local (connected hard drive, etc.), or remote location (network drive, Web site, etc.) from the perspective of computer system 101.

Method 400 includes an act of detecting that a user is attempting to access protected content through an application at the computer system, the protected content protected in accordance with a protection policy, the protection policy specified by a business owner of a business that originated the protected content, the protection policy indicating: users that are authorized to access the content, operations authorized users are permitted to perform with respect to the content, computing environments that are permitted to access the content, and a set of applications that are permitted to access the content (act 401). For example, operating system 202 can detect that content request 212 is an attempt to access protected content 213 from content location 204. Protected content 213 can be protected in accordance with protection policy 221 that is managed by protection server 205. Protection policy 221 can be specified by the business owner that originated protected content 213.

Protection policy 221 includes user permissions 222, authorized environments 223, and authorized applications 224. User permissions 222 represent a combination of authorized users for protected content 213 and operations that authorized users of protected content 213 are permitted to perform with respect to protected content 213. Similarly to application set 124, authorized applications 224 can indicate (e.g., by application ID) applications that are authorized to access protected content 213. Authorized applications 224 can also represent applications that are trusted to appropriately regulate access to protected content 213 in accordance with use permissions 222.

An operating environment can include a combination of one or more system attributes including: a network location (physical or logical), a boot path, a code integrity policy, boot options (e.g., kernel mode debugger enabled, safe mode, etc.), information from a system health agent ("SHA"), information from a system health validator ("SHV"), etc. Authorized environments 223 indicate operating environments that are trusted by protection server 205 to perform application set evaluation. Different combinations of system attributes can result in different authorized operating environments.

Method 300 includes an act of sending user identity information for the user to a content protection server (act 402). For example, computer system 101 can send identity information 215, such as, for example, user credentials, to protection server 205. Method 400 includes an act of sending the computing environment of the computer system to the content protection server (act 403). For example, computer system 101 can send computing environment 216 to protection server 205.

Computing environment 216 can include a combination of system attributes of computer system 201. Computer system 201 can use attestation, or some other secure mechanism, to send the computing environment to protection server 205 in a manner that protection server 205 trusts. Computing environment 216 can include one or more of: network location (physical or logical) for computer system 201, a boot path of operating system 202, a code integrity policy of operating system 202, boot options of operating system 202 (e.g., kernel mode debugger enabled, safe mode, etc.), information from a system health agent ("SHA") running at computer system 201, information from a system health validator ("SHV") running at computer system 201, etc.

Protection server 205 can use identity information 214 to determine if user 231 is an authorized user of protected content 213. For example, protection server 205 can use identity information 214 to locate permissions for user 231 in user permissions 222.

Protection server 205 can use computing environment 216 to determine if computer system 201 has an appropriate computing environment for evaluating application set membership. An appropriate environment for evaluating application set membership can indicate that protection server 205 is willing to trust the computing environment to properly evaluate application set membership. For example, protection server 205 can analyze system attributes in computing environment 216 to determine if some combination of system attributes included in computing environment 216 are indicative of an computing environment included in authorized environments 223 (and thus can be trusted to perform application set evaluation).

Different individual system attributes or combinations of system attributes can indicate an authorized computing environment. For example, a network address indicative of a computer system on a local network might be sufficient evidence of an appropriate environment for evaluating application set membership. On the other hand, for a computer system outside of a firewall a well known boot path, a sufficient code integrity policy, and specified health information may be required evidence to indicate an appropriate environment for evaluating application set membership.

When user 231 is an authorized user of protected content 213 and computing environment 216 is an authorized computing environment, protection server 205 can return user key 217 to computer system 201.

Method 400 includes an act of receiving a user key from the protection server, the user key usable by the user to access the protected content, the user key returned from the server to the computer system in response to authenticating the user and in response to determining that the computing environment is appropriate for evaluating application set membership (act 404). For example, computer system 201 can receive user key 217 from protection server 205. User key 217 is usable by user 231 to access protected content 213. User key 217 is returned to computer system 201 in response protection server 205 authenticating user 231 and determining that the operating environment of computer system 101 is appropriate for evaluating application set membership for application 203B.

Method 400 includes an act of an operating system at the computer system determining if the application is included in the set of applications in the protection policy (act 405). For example, operating system 202 can determine if application 203 is included in authorized applications 224. Operating system 202 can compare an application ID for application 203 to application IDs included authorized applications 224. If the comparison reveals a match, operating system 202 determines that application 203B is an authorized application. If the comparison does not reveal a match, operating system 202 determines that application 203B is not authorized application.

Method 400 includes an act of the operating system appropriately regulating the application's access to the protected content based on the determination (act 406). For example, operating system 202 can appropriately regulate application 203B's access to protected content 213 based on whether application 203B is an authorized application or application 203B is not an authorized application.

Thus, appropriate regulation of application access to protected content can include an act of the operating system permitting the application to access the protected content when the application is included in the set of applications in the protection policy (act 407). For example, when application 203B is included in authorized applications 224, operating system 202 can allow application 203B to use user key 217 to access protected content 213. Accordingly, application 203B can enforce user permissions 222 for user 231 with respect to protected content 213.

On the other hand, appropriate regulation of application access to protected content can also include an act of the operating system preventing the application form accessing the protected content when the application is not included in the set of applications in the protection policy (act 408). For example, when application 203B is not included in authorized applications 224, operating system 202 can prevent application 203B from accessing protected content 213. Lack of authorization can indicate that application 203B is not trusted to enforce user permissions 222 for protected content 213.

Accordingly, embodiments of the invention permit a local machine increased participation in authorizing access to protected content. For example, an operating system within an appropriate computing environment is permitted to determine if an application is authorized to access protected content. Thus, the application is relieved from having to store a publishing license. Further, authorization decisions are partially distributed, easing the resource burden on a protection server. Accordingly, embodiments of the invention can facilitate more robust and efficient authorization decisions when access to protected content is requested.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, which includes one or more processors, a method for providing access to protected content, the method comprising:

an act of the computer system detecting that a user is attempting to access protected content through an application at the computer system, the protected content protected in accordance with a protection policy, the protection policy managed by a digital rights management system that includes a separate digital rights management server, the protection policy including an application set which identifies a set of applications that are allowed to access the protected content according to the protection policy;

prior to allowing the application to access the protected content:

an act of the computer system exchanging information with the digital rights management server, the information including one or more attributes of the computer system's operating environment, the one or more attributes used by the digital rights management server to determine that the computer system is trusted to evaluate whether the application is in the application set;

based at least in part on the computer system exchanging information with the digital rights management server, an act of the computer system obtaining a user key corresponding to the user, the user key being usable for accessing the protected content, the user key issued by the digital rights management server after determining that the user is authorized to access the protected content and after determining that the computer system is trusted to evaluate whether the application is in the application set; and an act of the computer system determining that the application is in the application set; and subsequent to the computer system determining that the application is in the application set, an act of the computer system allowing the application to use the user key to access the protected content.

2. The method as recited in claim 1, wherein the act of detecting that a user is attempting to access protected content through an application at the computer system comprises an act of detecting that a user is attempting to access protected content protected in accordance with a protection policy, the protection policy including the application set and one or more computing environments that are appropriate for evaluating application set membership in the application set.

3. The method as recited in claim 1, wherein the application set includes one or more application IDs for applications that are authorized to access the protected content.

4. The method as recited in claim 1, wherein the protected content is protected in accordance with a protection policy of a business owner of the protected content.

5. The method as recited in claim 1, wherein the act of the computer system exchanging information with digital rights management server comprises:

an act of sending user authentication information for the user to the digital rights management server.

6. The method as recited in claim 1, wherein the attributes of the computer system's operating environment indicate one or more of a network location, a boot path for the operating system, a code integrity policy for the operating system, boot options for the operating system, information from a system health agent ("SHA"), and information from a system health validator ("SHV").

7. The method as recited in claim 3, wherein the act of the computer system determining that the application is in the application set comprises:

an act of an operating system at the computer system generating an application ID for the application; and an act of the operating system at the computer system determining that the application is in the application set by determining that the generated application ID is one of the application IDs for applications that are authorized to access the protected content.

8. The method as recited in claim 1, wherein the act of the computer system determining that the application is in the application set comprises:

an act of an the computer system comparing an application ID of the application to one or more application IDs included in the application set; and an act of determining that the application ID of the application is included in the application set.

9. At a computer system, which includes one or more processors, a method for providing access to protected content, the method comprising:

an act of detecting that a user is attempting to access protected content through an application at the computer system, the protected content protected in accordance with a protection policy, the protection policy specified by a business owner of a business that originated the protected content, the protection policy indicating: users that are authorized to access the content, operations authorized users are permitted to perform with respect to the protected content, computing environments that are permitted to access the content, and a set of applications that are permitted to access the content;

an act of sending user identity information for the user to a content protection server;

an act of sending one or more attributes of a computing environment of the computer system to the content protection server, including one or more attributes indicating that the computer system is sufficiently trusted to evaluate whether the application is in the set of applications that are permitted to access the content;

an act of receiving a user key from the content protection server, the user key usable by the user to access the protected content, the user key returned from the content protection server to the computer system in response to authenticating the user based on the user identity information and in response to determining that the one or more attributes of the computing environment indicate that the computer system is sufficiently trusted to evaluate whether the application is in the set of applications that are permitted to access the content;

an act of an operating system at the computer system determining if the application is included in the set of applications in the protection policy; and an act of the operating system appropriately regulating the application's access to the protected content based on the determination, including:

an act of permitting the application to access the protected content when the application is included in the set of applications in the protection policy; and an act of preventing the application form accessing the protected content when the application is not included in the set of applications in the protection policy.

10. The method as recited in claim 9, authorized applications in the set of applications are applications trusted to appropriately enforce the operations users are permitted to perform.

11. The method as recited in claim 9, wherein the act of sending user identity information for the user to a content protection server comprises an act of sending user credentials to the protection server.

12. The method as recited in claim 9, wherein the act of sending one or more attributes of a computing environment of the computer system to the content protection server comprises an act of sending attributes indicating one or more of a network location, a boot path for the operating system, a code integrity policy for the operating system, boot options for the operating system, information from a system health agent ("SHA"), and information from a system health validator ("SHV").

13. The method as recited in claim 9, wherein the act of the operating system at the computer system determining if the application is included in the set of applications in the protection policy comprises an act of the operating system:
generating an application ID for the application, and
comparing the generated application ID for the application to application IDs included in the protection policy.

14. The method as recited in claim 9, wherein the act of the operating system at the computer system determining if the application is included in the set of applications in the protection policy comprises an act of the operating system determining that the application is included in the set of applications.

15. The method as recited in claim 9, wherein the act of permitting the application to access the protected content comprises an act of the application enforcing operations authorized users are permitted to perform with respect to the protected content.

16. A computer system, the computer system comprising:
one or more processors;
system memory; and
one or more computer-readable media having stored thereon computer executable instructions that, when executed by one of the processors, cause the computer system to provide access to protected content, including the following:
detect that a user is attempting to access protected content through an application at the computer system, the protected content protected in accordance with a digital rights management (DRM) protection policy, the DRM protection policy specified by a business owner of a business that originated the protected content, the protection policy indicating: users that are authorized to access the content, operations authorized users are permitted to perform with respect to the protected content, computing environments that are permitted to access the content, and a set of applications that are permitted to access the content;
send user credentials for the user to a DRM server;
send one or more system attributes of the computer system to the DRM server to indicate that the computing environment of the computer system can be trusted by the DRM server to evaluate whether the application at the computer system is in the set of applications that are permitted to access the content;
receive a user key from the DRM server, the user key usable by the user to access the protected content, the user key returned from the DRM server to the computer system in response to authenticating the user with the user credentials and in response to determining that the one or more system attributes indicate a computing environment that can be trusted by the DRM server to evaluate whether the application is in the set of applications that are permitted to access the content according to the protection policy;
an operating system at the computer system determining if the application is included in the set of applications in the protection policy, inclusion in the set of applications indicative of an application that is trusted to enforce operations authorized users are permitted to perform with respect to the protected content; and
the operating system appropriately regulating the application's access to the protected content based on the determination, including:
permitting the application to enforce operations authorized users are permitted to perform with respect to the protected content when the application is included in the set of applications in the protection policy; and
preventing the application from accessing the protected content when the application is not included in the set of applications in the protection policy.

17. The system as recited in claim 16, wherein untrusted applications excluded from the set of applications are tagged as unusable by the operating system to enforce operations authorized users are permitted to perform with respect to the protected content.

18. The system as recited in claim 16, wherein computer executable instructions that, when executed by one of the processors, cause the computer system to determine if the application is included in the set of applications in the protection policy comprise computer executable instructions that, when executed by one of the processors, cause the computer system to generate an application ID for the application and to compare the generated application ID for the application to application IDs in the set of the applications.

19. The system as recited in claim 16, wherein computer executable instructions that, when executed by one of the processors, cause the computer system to send one or more system attributes of the computer system to the DRM server, to indicate the computing environment of the computer system to the DRM server comprise computer executable instructions that, when executed by one of the processors, cause the computer system to send one or more of: a network location, a boot path for the operating system, a code integrity policy for the operating system, boot options for the operating system, information from a system health agent ("SHA"), and information from a system health validator ("SHV").

20. The method as recited in claim 7, wherein the act generating an application ID for the application comprises an act of generating the application ID from one or more of an application version, an application patch history, an application ownership, or an application certification of the application.

* * * * *